United States Patent
Robertson et al.

(10) Patent No.: US 11,233,383 B2
(45) Date of Patent: Jan. 25, 2022

(54) BUSHING AND METHOD FOR SUPPORTING ELECTRICAL WIRING EXTENDING THROUGH A HOLE IN A SUPPORT STRUCTURE, AND AN AIRCRAFT INCLUDING THE BUSHING

(71) Applicant: Gulfstream Aerospace Corporation, Savannah, GA (US)

(72) Inventors: Jeffrey Robertson, Savannah, GA (US); Mai Trinh Le, Savannah, GA (US); Fadi Khoury, Savannah, GA (US); Nizar Mouna, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 166 days.

(21) Appl. No.: 16/522,365

(22) Filed: Jul. 25, 2019

(65) Prior Publication Data
US 2021/0028609 A1    Jan. 28, 2021

(51) Int. Cl.
*H02G 3/00* (2006.01)
*H02G 3/22* (2006.01)
*H02G 3/04* (2006.01)

(52) U.S. Cl.
CPC .............. *H02G 3/22* (2013.01); *H02G 3/0456* (2013.01)

(58) Field of Classification Search
CPC ................................ H02G 3/22; H02G 3/0456
See application file for complete search history.

(56) References Cited

U.S. PATENT DOCUMENTS

| 4,350,839 | A | * | 9/1982 | Lass ........................ H02G 3/083 174/153 G |
| 4,685,173 | A | * | 8/1987 | Pavur ................... B60R 16/0222 16/2.2 |
| 5,071,143 | A | * | 12/1991 | Byerly ..................... H02G 3/22 277/606 |
| 5,739,468 | A |   | 4/1998 | Patel et al. |

(Continued)

FOREIGN PATENT DOCUMENTS

| DE | 102007018332 A1 | 10/2008 |
| DE | 102010040500 A1 | 3/2012 |

(Continued)

OTHER PUBLICATIONS

GB2521771A (Year: 2015).*
WO 9731415 (Year: 1997).*

*Primary Examiner* — Pete T Lee
(74) *Attorney, Agent, or Firm* — LKGlobal | Lorenz & Kopf, LLP

(57) ABSTRACT

Bushings and methods for supporting electrical wiring extending through a hole in a support structure, and aircraft including such bushings are provided. In one example, the bushing includes a grommet. The grommet includes a grommet body portion surrounding an opening that extends through the hole. A grommet collar portion extends from the grommet body portion about the opening. The grommet collar covers an interior edge surrounding the hole of the support structure. An attachment flange extends from the grommet away from the opening. The attachment flange is attached to the support structure adjacent to the hole. A shelf extends from the grommet adjacent to the opening to help support the electrical wiring extending through the opening.

14 Claims, 9 Drawing Sheets

(56) References Cited

U.S. PATENT DOCUMENTS

| | | | |
|---|---|---|---|
| 10,272,855 B2 * | 4/2019 | Yabashi | F16L 5/10 |
| 10,574,046 B2 * | 2/2020 | Okuhara | H01B 7/0045 |
| 10,587,104 B2 * | 3/2020 | Pagoto | H02G 1/06 |
| 2011/0024184 A1 * | 2/2011 | Clymer | H02G 3/22 |
| | | | 174/503 |

FOREIGN PATENT DOCUMENTS

| | | |
|---|---|---|
| FR | 2694655 A1 | 2/1994 |
| WO | 9731415 A2 | 8/1997 |
| WO | 9731415 A3 | 9/1997 |

* cited by examiner

BUSHING AND METHOD FOR SUPPORTING ELECTRICAL WIRING EXTENDING THROUGH A HOLE IN A SUPPORT STRUCTURE, AND AN AIRCRAFT INCLUDING THE BUSHING

TECHNICAL FIELD

The technical field relates generally to arranging electrical wiring extending through a support structure, and more particularly, relates to a bushing adapted to be mounted to a support structure surrounding a hole formed through the support structure for supporting electrical wiring extending through the hole, a method for supporting electrical wiring extending through a hole in a support structure using such a bushing, and an aircraft including such a bushing.

BACKGROUND

Aircraft and other vehicles, for example, employ electrical wiring (e.g., wire harnesses or the like) that include a plurality of wires for providing electrical communication between the various electronic components, vehicle devices and/or the like. Typically, the electrical wiring is routed through various areas and/or structures of the vehicle that may be hidden, concealed, and/or otherwise not exposed to the vehicle occupant(s). As such, often the electrical wiring needs to be routed through support structures of the vehicle in which the support structures include holes for allowing the electrical wiring to pass through the structure.

Many vehicles, such as, for example, aircraft or the like, must comply with various requirements for electrical harness installations that pass through holes in support structures. For example, one requirement is that a support is needed for carrying the weight and securing the position of the electrical wiring extending through a hole in a support structure. Another requirement is that the electrical wiring needs to be protected from interior edges that form the holes in the support structure to prevent chafing and/or damage to the electrical wiring. Further, it is important that the process for installing electrical wiring extending through holes in support structures be relatively efficient and ergonomically friendly to minimize, reduce, or limit installation times.

Accordingly, it is desirable to provide a device that can be efficiently and ergonomically friendly mounted to a support structure having an interior edge surrounding a hole formed through the support structure in which the device positions and supports electrical wiring extending through the hole, and a method using such a device for supporting electrical wiring extending through the hole of the support structure. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a bushing adapted to mount to a support structure having an interior edge surrounding a hole formed through the support structure and to support electrical wiring extending through the hole, various non-limiting embodiments of a method for arranging electrical wiring extending through a hole in a support structure, and various non-limiting embodiments of an aircraft including a bushing for supporting electrical wiring extending through a hole in an aircraft support structure, are provided herein.

In a first non-limiting embodiment, the bushing includes, but is not limited to, a grommet. The grommet includes, but is not limited to, a grommet body portion surrounding an opening that extends through the hole when the bushing is mounted to the support structure. The grommet further includes, but is not limited to, a grommet collar portion extending from the grommet body portion about the opening. The grommet collar is configured to cover the interior edge of the support structure when the bushing is mounted to the support structure. The bushing further includes, but is not limited to, an attachment flange that extends from the grommet away from the opening. The attachment flange is configured for attaching to the support structure adjacent to the hole. The bushing further includes, but is not limited to, a shelf that extends from the grommet adjacent to the opening. The shelf is configured to help support the electrical wiring extending through the opening.

In another non-limiting embodiment, the method includes, but is not limited to, obtaining a bushing. The bushing includes, but is not limited to, a grommet. The grommet includes, but is not limited to, a grommet body portion surrounding an opening. The grommet further includes, but is not limited to, a grommet collar portion extending from the grommet body portion about the opening. The bushing further includes, but is not limited to, an attachment flange extending from the grommet away from the opening. The bushing further includes, but is not limited to, a shelf extending from the grommet adjacent to the opening. The method further includes, but is not limited to, attaching the attachment flange to the support structure adjacent to the hole such that the opening extends through the hole and the grommet collar portion covers an interior edge of the support structure that surrounds the hole. The method further includes, but is not limited to, disposing the electrical wiring through the opening. The method further includes, but is not limited to, at least partially supporting the electrical wiring by the shelf.

In another non-limiting embodiment, the aircraft includes, but is not limited to, an aircraft support structure having an interior edge surrounding a hole that is formed through the aircraft support structure. The aircraft further includes, but is not limited to, a bushing mounted to the aircraft support structure. The bushing includes, but is not limited to, a grommet. The grommet includes, but is not limited to, a grommet body portion surrounding an opening that extends through the hole. The grommet further includes, but is not limited to, a grommet collar portion extending from the grommet body portion about the opening and covering the interior edge of the aircraft support structure. The bushing further includes, but is not limited to, an attachment flange extending from the grommet away from the opening and attached to the aircraft support structure adjacent to the hole. The bushing further includes, but is not limited to, a shelf extending from the grommet adjacent to the opening. The aircraft further includes, but is not limited to, electrical wiring extending through the opening at least partially supported by the shelf.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
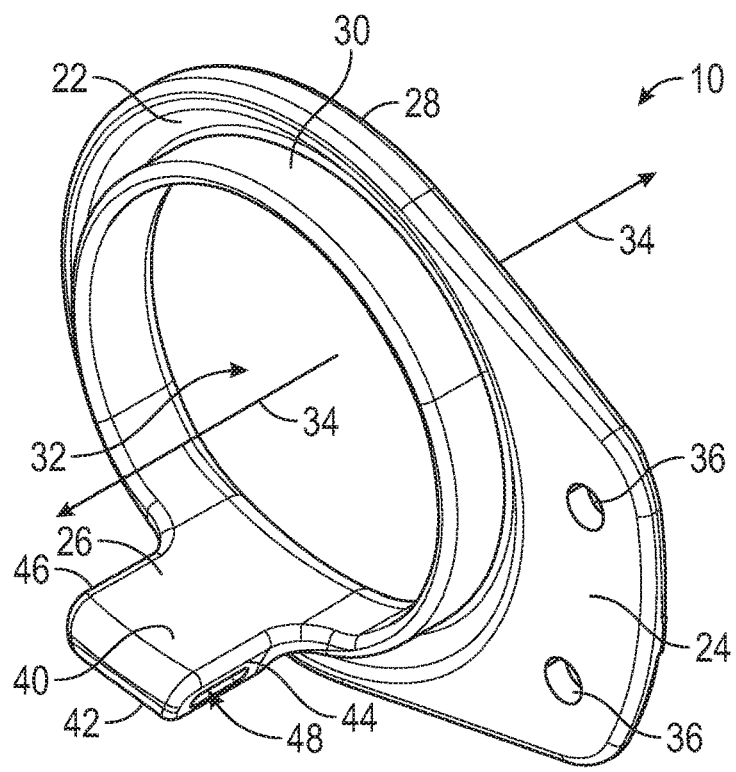
FIG. 1 illustrates a perspective rear view of a bushing in accordance with an exemplary embodiment.
Figure 2:
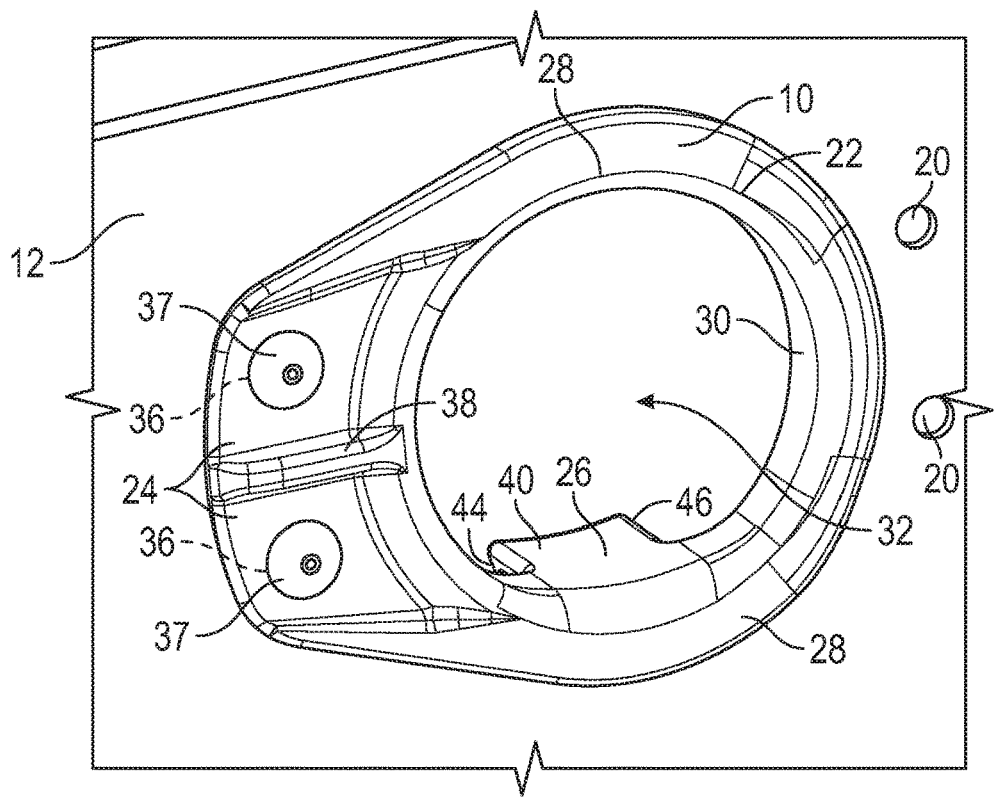
FIG. 2 illustrates a perspective front view of a bushing mounted to a support structure in accordance with an exemplary embodiment.
Figure 3:
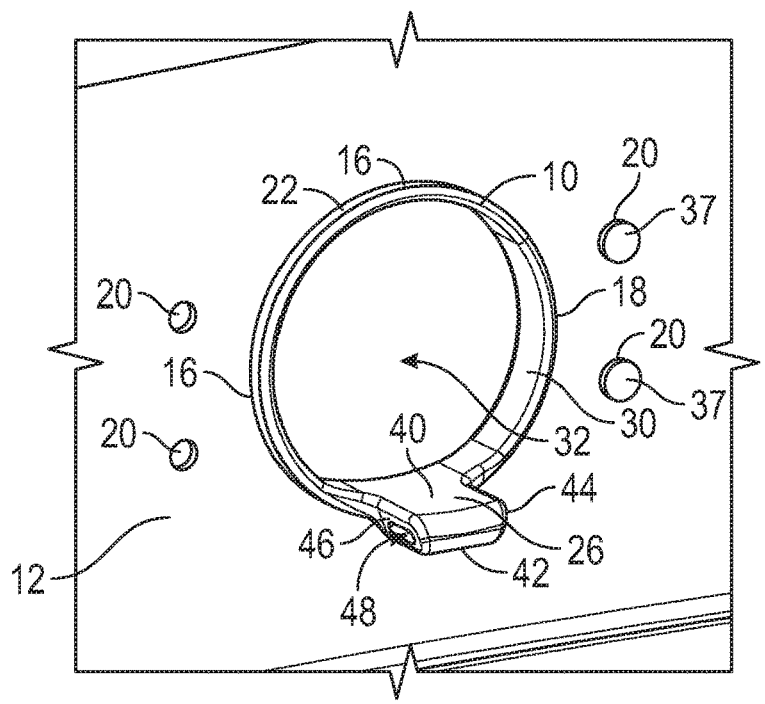
FIG. 3 illustrates a perspective rear view of a bushing mounted to a support structure in accordance with an exemplary embodiment.
Figure 4:
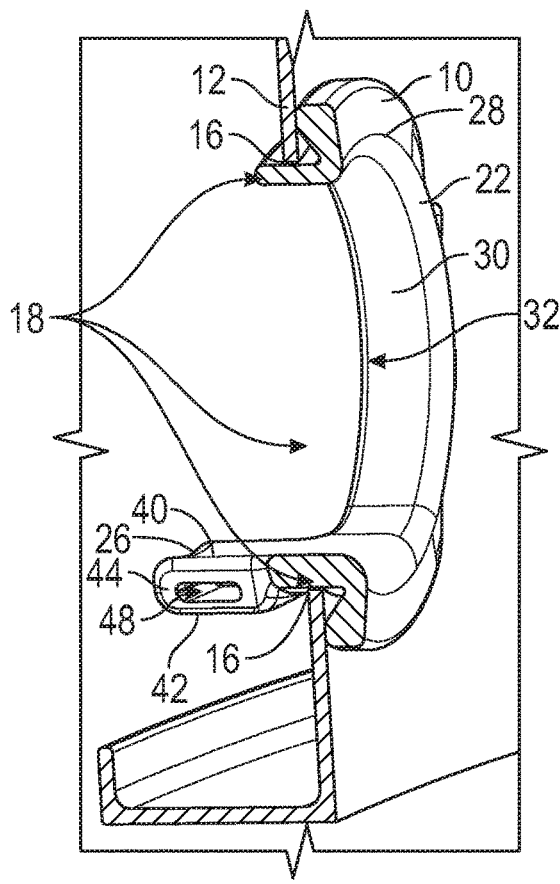
FIG. 4 illustrates a sectional view of a bushing mounted to a support structure in accordance with an exemplary embodiment.
Figure 5:
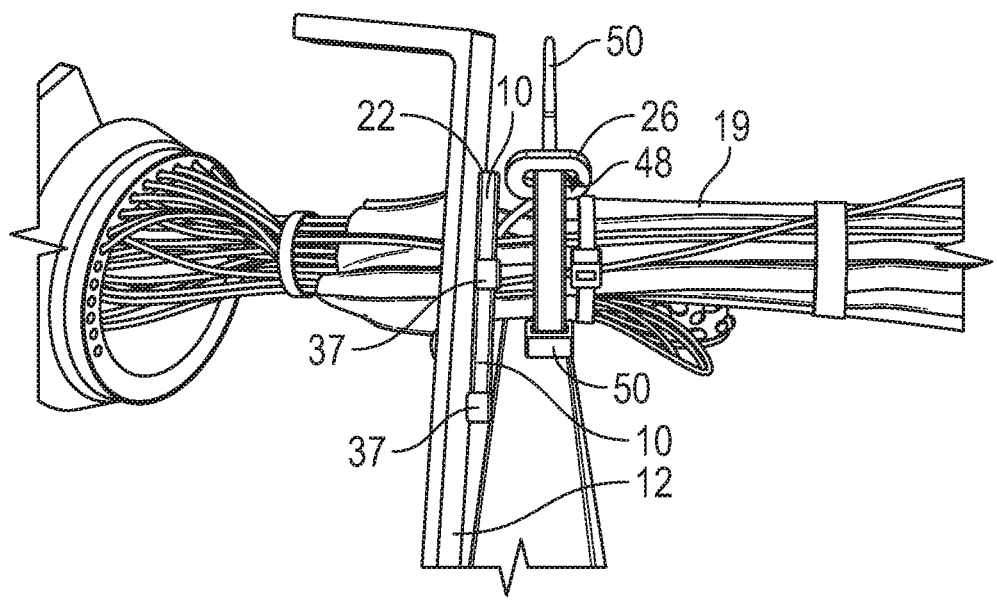
FIG. 5 illustrates a side view of a bushing mounted to a support structure supporting wiring extending through the support structure in accordance with an exemplary embodiment.
Figure 6:
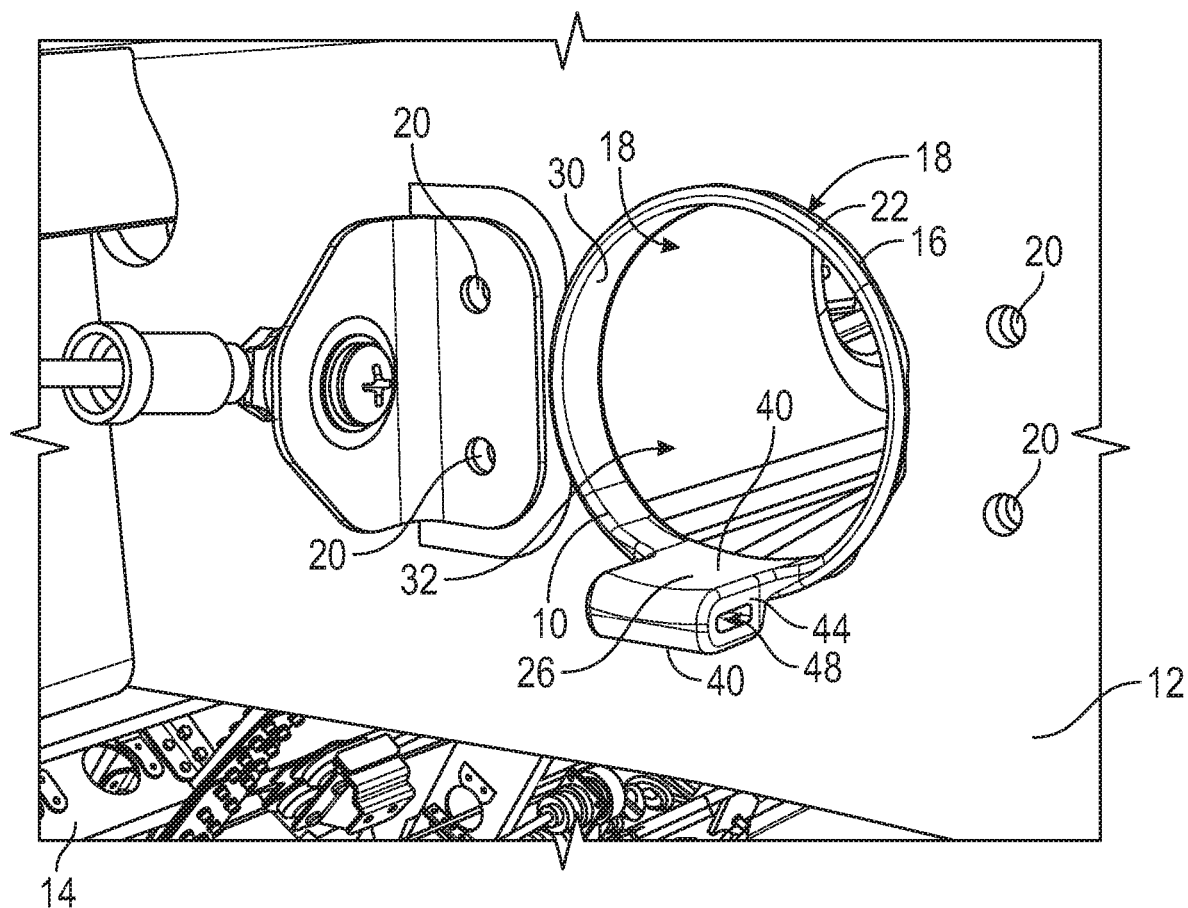
FIG. 6 illustrates a perspective rear view of a bushing mounted to a support structure in accordance with an exemplary embodiment.
Figure 7:
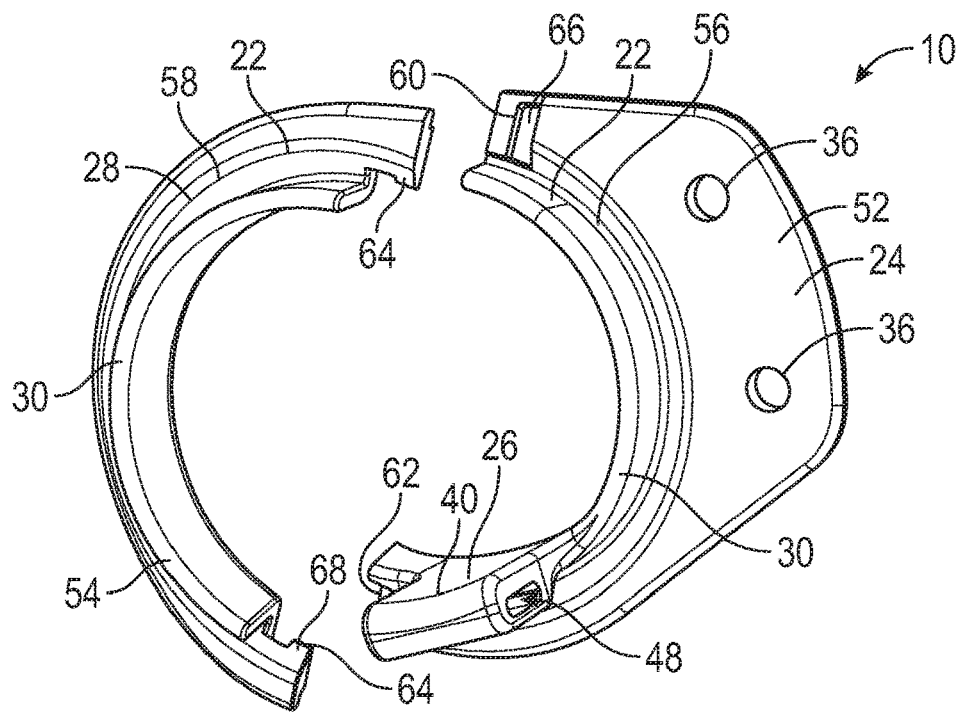
FIG. 7 illustrates an exploded view of a two-piece assembly of a bushing in accordance with an exemplary embodiment.
Figure 8:
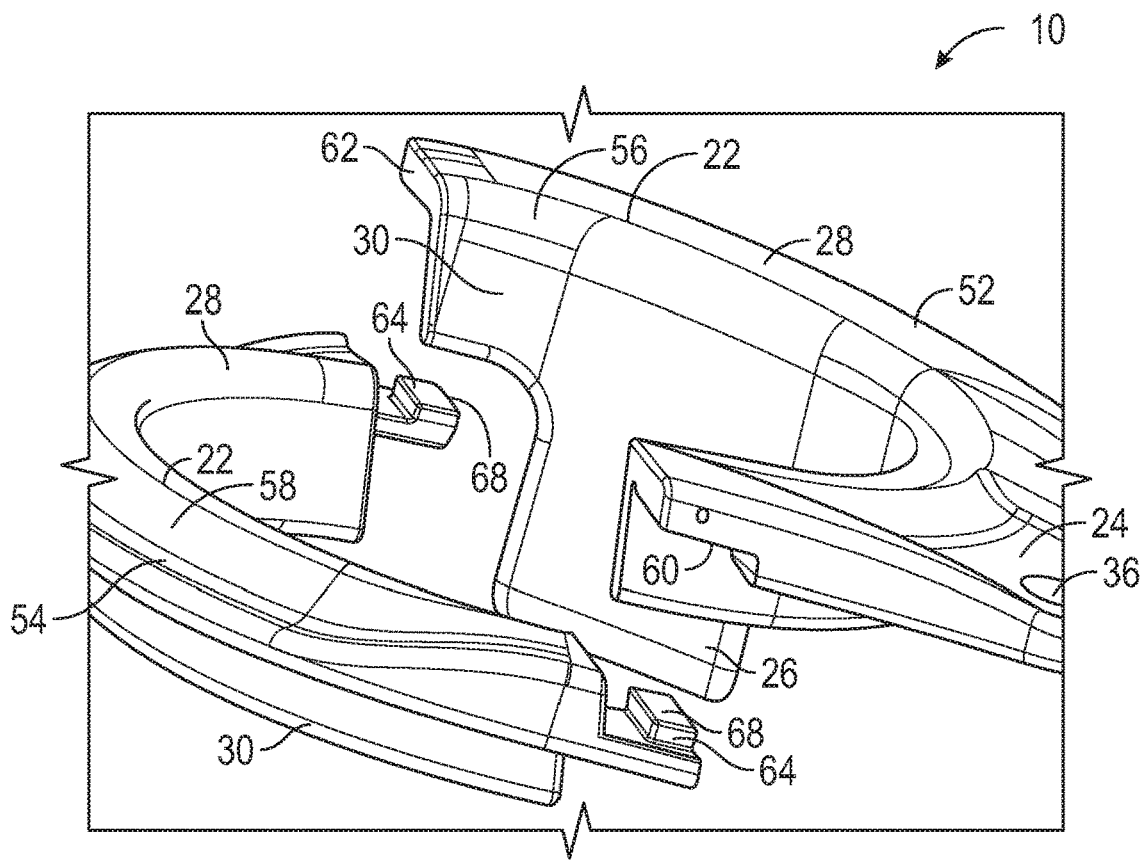
FIG. 8 illustrates an exploded view of a two-piece assembly of a bushing in accordance with an exemplary embodiment.
Figure 9:
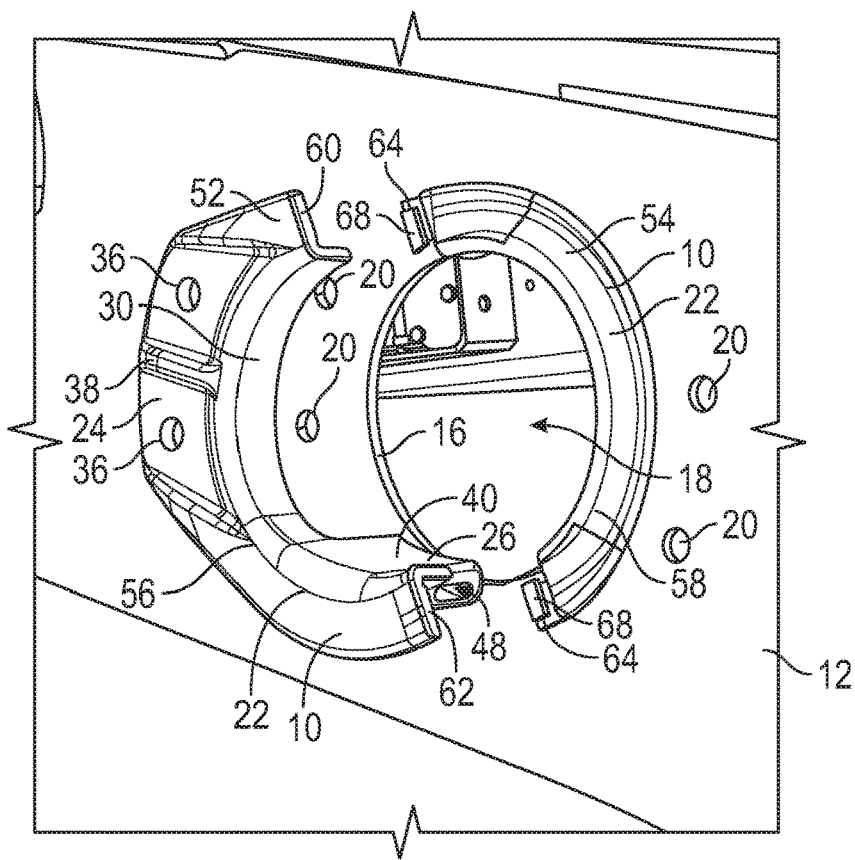
FIG. 9 illustrates a perspective front view of a partially assembled, two-piece assembly of a bushing and a support structure in accordance with an exemplary embodiment.
Figure 10:
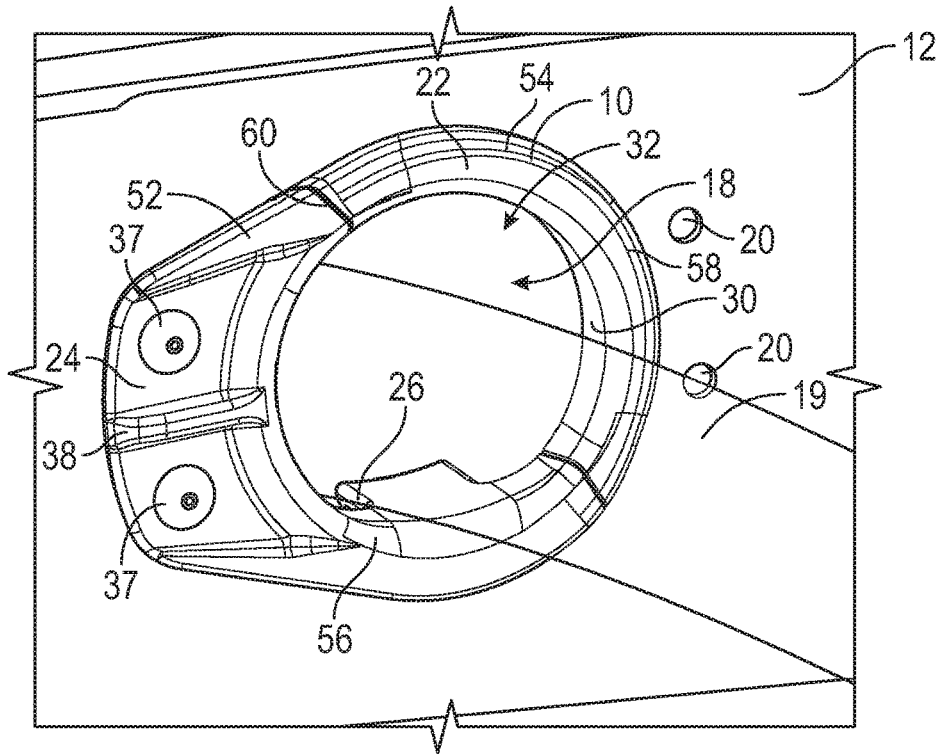
FIG. 10 illustrates a perspective front view of a bushing mounted to a support structure supporting electrical wiring in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to bushings adapted to be mounted to a support structure that has an interior edge surrounding a hole formed through the support structure for supporting electrical wiring extending through the hole, methods for supporting electrical wiring extending through a hole in a support structure using such bushings, and aircraft including such bushings. The bushing includes a grommet that includes a grommet body portion and a grommet collar portion. The grommet body portion surrounds an opening. The opening of the grommet extends through the hole of the support structure when the bushing is mounted to the support structure. The grommet collar portion extends from the grommet body portion about the opening and protectively covers the interior edge of the support structure when the bushing is mounted to the support structure.

The bushing further includes an attachment flange and a shelf. The attachment flange extends from the grommet in a direction away from the opening. In an exemplary embodiment, the attachment flange can be efficiently and ergonomically attached to the support structure adjacent to the hole by one or more fasteners (e.g., rivet(s), threaded fastener(s), or the like). The shelf extends from the grommet adjacent to the opening and helps provide support for electrical wiring extending through the opening.

In an exemplary embodiment, a coupling member (e.g., clamping member, high strap or strapping member, or the like) couples the electrical wiring to the shelf, which advantageously provides support for carrying the weight and securing the position of the portion of the electrical wiring extending through the hole in the support structure. Further, in an exemplary embodiment, by covering the interior edge of the support structure with the grommet collar portion, advantageously the portion of the electrical wiring extending through the hole in the support structure is protected from chafing and/or damage.

Referring to FIGS. 1-6, a bushing 10 in accordance with an exemplary embodiment is provided. The bushing 10 is mountable to a support structure 12. In an exemplary embodiment, the support structure 12 is an aircraft support structure of an aircraft 14. For example, the support structure 12 may be a ring frame structure of an aircraft fuselage, an aircraft bulkhead structure, or the like. Alternatively, the support structure may be part of a vehicle or other structure other than part of a vehicle.

The support structure 12 has an interior edge 16 surrounding a hole 18 that is formed through the support structure 12. In an exemplary embodiment, the hole 18 provides a passageway for electrical wiring 19 that extends through the support structure 12 for routing the electrical wiring 19 through the aircraft 14 or other vehicle or structure. The hole 18 may have a substantially circular shape, or alternatively have a different shape, such as, for example, a polygonal shape, or otherwise. As illustrated and will be discussed in further detail below, adjacent to the hole 18 are spaced apart satellite holes 20 formed through the support structure 12 for mounting one or more various devices, apparatuses, brackets, or the like, for example with fasteners or the like, adjacent to the hole 18.

As illustrated, the bushing 10 includes a grommet 22, an attachment flange 24, and a shelf 26. In an exemplary embodiment, the grommet 22 includes a grommet body portion 28 and a grommet collar portion 30. The grommet body portion surrounds an opening 32. The opening 32 may have a shape that substantially matches the shape of the hole 18. Alternatively, the opening 32 may have a shape that substantially differs from the shape of the hole 18. However, regardless of the shape of the hole 18 and/or opening 32, the opening 32 is sized smaller than the hole 18 so that the opening 32 can be arranged in and extend through the hole 18 when the bushing 10 is mounted to the support structure 12 about the hole 18. In an exemplary embodiment, the opening 32 has a substantially circular shape. Alternatively, the opening 32 may have a non-circular shape, such as, for example, a polygonal shape or otherwise.

As illustrated, the grommet collar portion 30 extends from the grommet body portion 28 about the opening 32. In an exemplary embodiment, when the bushing 10 is mounted to the support structure 12 about the hole 18, the grommet collar portion 30 extends rearwardly from the grommet body portion 28 through the hole 18 to protectively cover the interior edge 16 of the support structure 12, thereby preventing the electrical wiring 19 from contacting the interior edge 16 to prevent chafing and/or damage to the electrical wiring 19.

The attachment flange 24 extends from the grommet 22 in a direction away from the opening 32, for example in a direction transverse to a central axis (indicated by double headed arrow 34) of the opening 32. The attachment flange 24 is configured to attach to the support structure 12 adjacent to the hole 18 to mount and positionally orient the bushing 10 including the shelf 26 to the support structure 12. As illustrated, the attachment flange 24 has a spaced apart attachment openings 36 that are formed through the attachment flange 24 and that are sized or otherwise configured for receiving fasteners 37 (e.g., rivets, threaded fasteners, or the like) that extend through the adjacent satellite holes 20 for attaching the attachment flange 24 to the support structure 12. In an exemplary embodiment, disposed between the attachment openings 36 is a stiffening rib 38 that provides structure and or additional stiffening to the attachment flange 24.

In an exemplary embodiment, the shelf 26 extends from the grommet 22 adjacent to the opening 32 to help support the electrical wiring 19 extending through the opening 32. As illustrated, the shelf 26 is spaced apart from the attachment flange 24 and extends rearwardly from the grommet collar portion 30. Alternatively and as will be discussed in further detail below, the shelf 26 may extend in a forwardly direction from the grommet body portion 28 (as shown in FIGS. 10-16).

With continuing reference to FIGS. 1-6, in an exemplary embodiment, the shelf 26 has a surface 40 facing generally towards the central axis 34, a surface 42 opposite the surface 40, and lateral sides 44 and 46 that are opposite from each other and that extend from the surface 40 to the surface 42. Notably, although the shelf 26 is shown as being oriented directly below the central axis 34, various embodiments contemplated herein include the bushing 10 in other positions about the central axis 34 in which the shelf 26 is in a rotated position about the central axis 34 other than being directly below the central axis 34. The shelf 26 has a shelf opening 48 formed therethrough extending from the lateral side 44 to the lateral side 46 for receiving a coupling member 50 that couples the electrical wiring 19 to the shelf 26. As illustrated, the coupling member 50 is configured as a strap member e.g., tie strap or the like, that extends through the shelf opening 48 and surrounds and firmly couples the electrical wiring 19 to the shelf 26 such that the shelf 26 can substantially carry the weight of the adjacent portion of the electrical wiring 19.

In an exemplary embodiment, the bushing 10 including the grommet 22, the attachment flange, and the shelf is a monolithic structure. For example, the bushing 10 may be formed by a molding process, such as, for example, an injection molding process, a 3-D printing process, or the like, to form a single, monolithic bushing 10. In an exemplary embodiment, the bushing 10 is formed by injection molding a polymeric and/or plastic material, such as polyether ether ketone (PEEK), polyamide (e.g., Nylon), polyester, acetal, or the like.

Referring to FIGS. 7-10, in an exemplary embodiment, the bushing 10 is a multi-piece assembly, such as, for example, a two-piece assembly. As illustrated, the bushing 10 is configured as a multi-piece assembly includes bushing sections 52 and 54 that are formed as distinct parts and that interlock or otherwise couple together, for example, for mounting to the support structure 12. The bushing section 52 includes a grommet section 56 of the grommet 22, the attachment flange 24 extending from the grommet section 56, and the shelf 26 extending from the grommet section 56. The bushing section 54 includes a grommet section 58 of the grommet 22 that couples to the grommet section 56 to form the grommet body portion 28 surrounding the opening 32 and the grommet collar portion 30 extending from the grommet body portion 28 about the opening 32. The bushing section 52 includes bushing end portions 60 and 62 with negative features 66 and the bushing section 54 has attachment tabs 64 with positive features 68, for example, that engage the bushing end portions 60 and 62, which overlap the attachment tabs 64, to couple the bushing sections 52 and 54 together.

Figure 11:
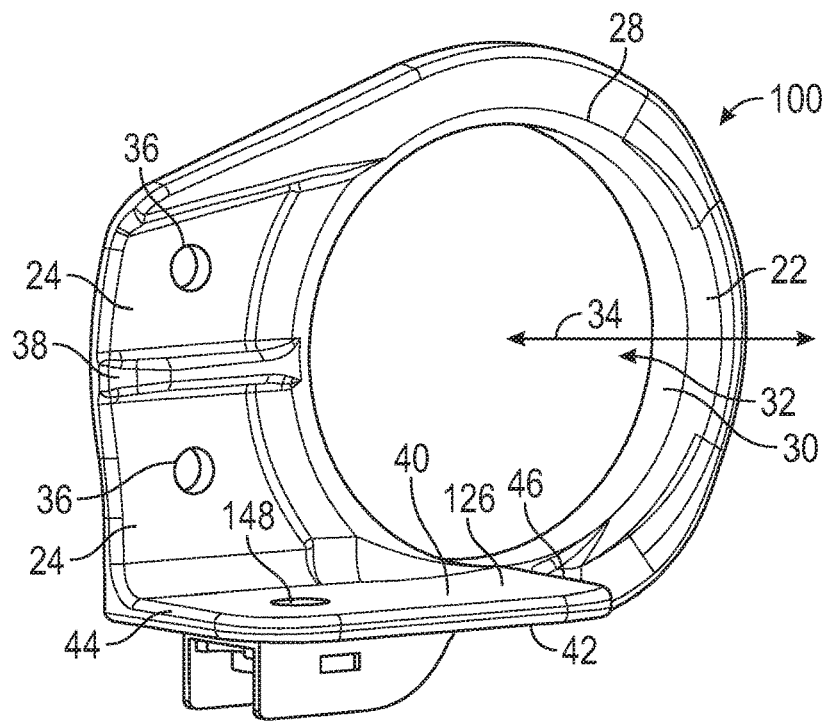
FIG. 11 illustrates a perspective view of a bushing in accordance with an exemplary embodiment.
Figure 12:
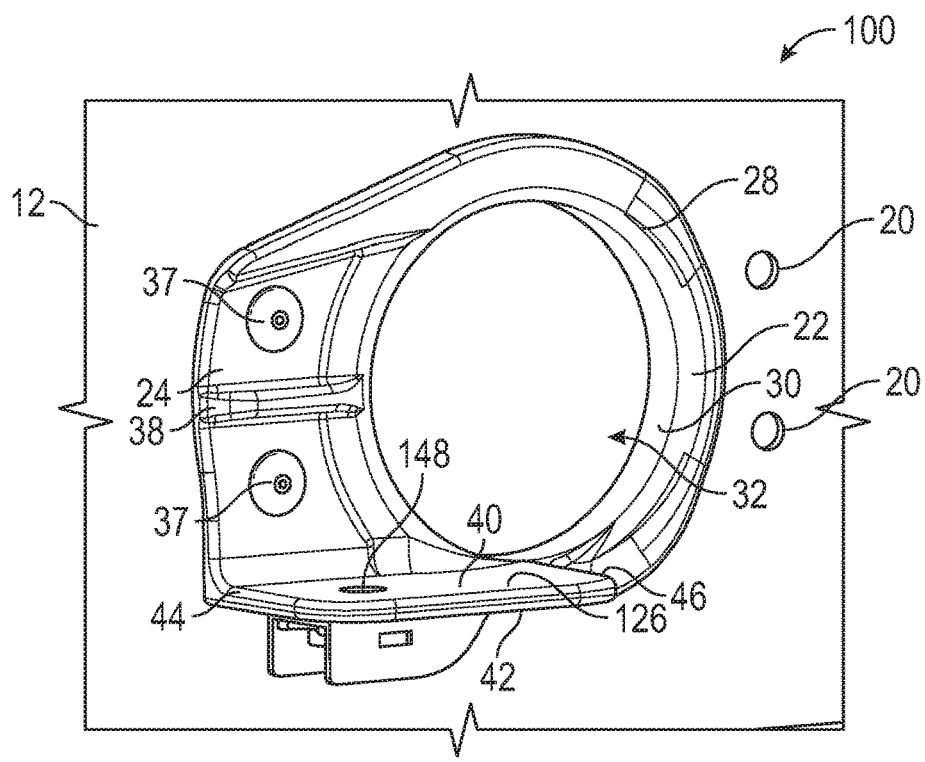
FIG. 12 illustrates a perspective front view of a bushing mounted to a support structure in accordance with an exemplary embodiment.
Figure 13:
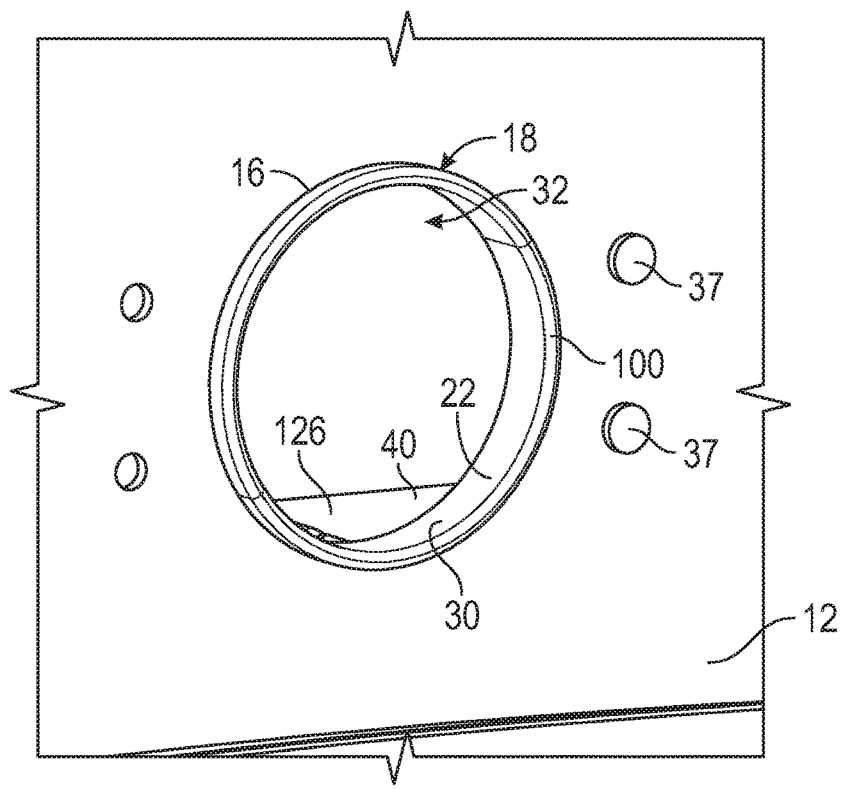
FIG. 13 illustrates a perspective rear view of a bushing mounted to a support structure in accordance with an exemplary embodiment.
Figure 14:
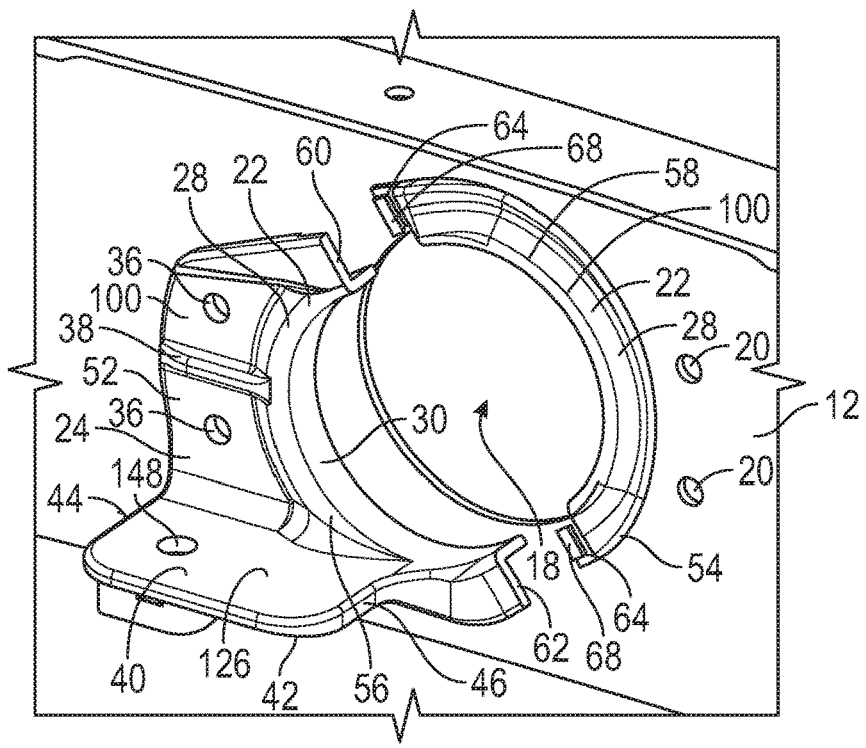
FIG. 14 illustrates a perspective front view of a partially assembled, two-piece assembly of a bushing and a support structure in accordance with an exemplary embodiment.
Figure 15:
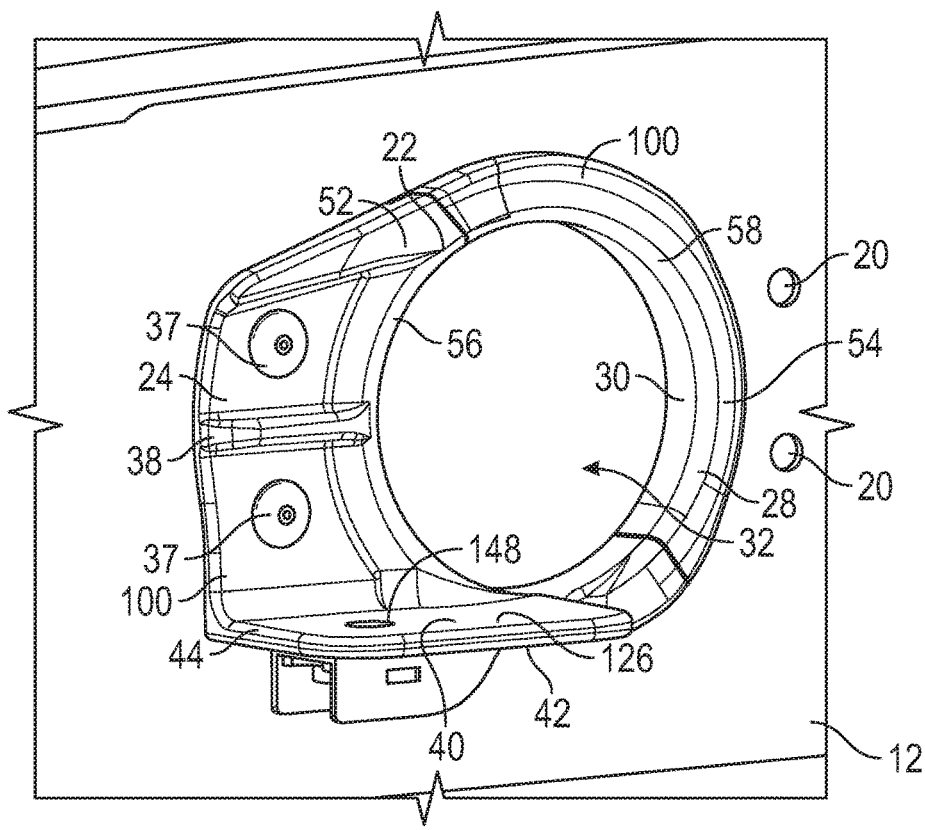
FIG. 15 illustrates a perspective front view of a bushing mounted to a support structure in accordance with an exemplary embodiment.
Figure 16:
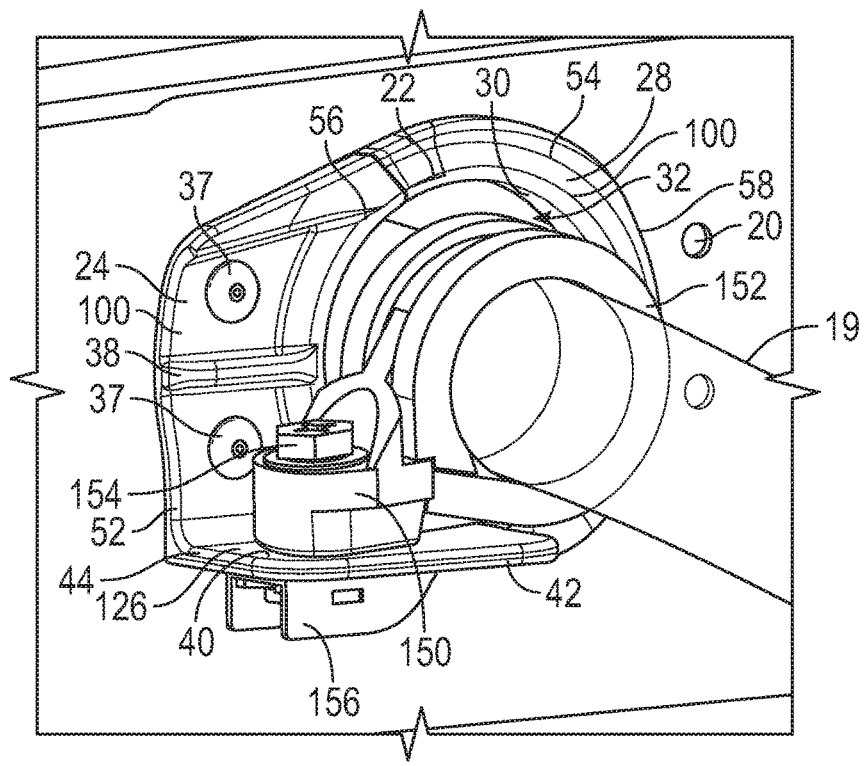
FIG. 16 illustrates a perspective front view of a bushing mounted to a support structure supporting electrical wiring in accordance with an exemplary embodiment.

Referring to FIGS. 11-16, a bushing 100 in accordance with other exemplary embodiments is provided. In particular, the bushing 100 as illustrated in FIGS. 11-13 is similarly configured as the monolithic bushing 10 as illustrated in FIGS. 1-6 including the grommet 22 and the attachment flange 24, but with the exception that the bushing 100 has a shelf 126 that is configured differently than the shelf 26 of the bushing 10. Likewise, the bushing 100 as illustrated in FIGS. 14-16 is similarly configured as the multi-piece assembly bushing 10 including the bushing sections 52 and 54 as illustrated in FIGS. 7-10, but with the exception that the bushing 100 has the shelf 126 that is configured differently than the shelf 26 of the bushing 10.

In an exemplary embodiment, when the bushing 100 is mounted to the support structure 12 about the hole 18, the grommet collar portion 30 extends rearwardly from the grommet body portion 28 through the hole 18 to protectively cover the interior edge 16 of the support structure 12, thereby preventing the electrical wiring 19 from contacting the interior edge 16 to prevent chafing and/or damage to the electrical wiring 19. As illustrated, the shelf 126 extends forwardly from both the grommet body portion 28 and the attachment flange 24 in a direction away from the support structure 12. The shelf 126 has a shelf opening 148 formed therethrough extending from the surface 40 that faces generally towards the central axis 34 to the surface 42 for receiving a coupling member 150 for coupling the electrical wiring 19 to the shelf 126. In an exemplary embodiment, the coupling member 150 is a clamping member such as a P-clamp or the like. The clamping member includes a clamping portion 152 that surrounds the electrical wiring 19 adjacent to the surface 40, a fastener 154 that extends from the clamping portion 152 through the shelf opening 148, and a nut 156 that engages the fastener 154 adjacent to the surface 42 of the shelf 126 to couple the electrical wiring 19 to the shelf 126.

Figure 17:
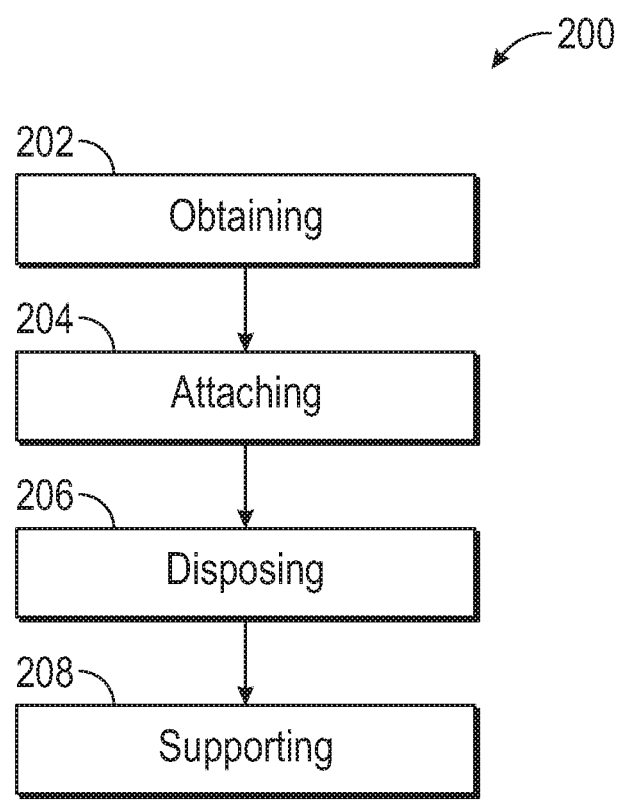
FIG. 17 illustrates a method for arranging electrical wiring extending through a hole that is formed through a support structure in accordance with an exemplary embodiment.

FIG. 17 illustrates a method 200 for arranging electrical wiring extending through a hole that is formed through a support structure in accordance with an exemplary embodiment. The method 200 includes obtaining (STEP 202) a bushing. The bushing includes a grommet, an attachment flange, and a shelf. The grommet includes a grommet body portion surrounding an opening and a grommet collar portion extending from the grommet body portion about the opening. The attachment flange extends from the grommet away from the opening. The shelf extends from the grommet adjacent to the opening.

The method 200 further includes attaching (STEP 204) the attachment flange to the support structure adjacent to the hole such that the opening extends through the hole and the grommet collar portion covers an interior edge of the support structure that surrounds the hole. The electrical wiring is disposed (STEP 206) through the opening. The electrical wiring is at least partially supported (STEP 208) by the shelf.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A bushing adapted to mount to a support structure having an interior edge surrounding a hole formed through the support structure and to support electrical wiring extending through the hole, the bushing comprising:
    a grommet comprising;
        a grommet body portion surrounding an opening that extends through the hole when the bushing is mounted to the support structure; and
        a grommet collar portion extending from the grommet body portion about the opening and configured to cover the interior edge of the support structure when the bushing is mounted to the support structure;
    an attachment flange extending from the grommet away from the opening and configured for attaching to the support structure adjacent to the hole; and
    a shelf extending from the grommet adjacent to the opening and configured to help support the electrical wiring extending through the opening, wherein the bushing is a two-piece assembly that includes a first bushing section and a second bushing section that is coupled to the first bushing section, and wherein the first bushing section comprises a first grommet section of the grommet, the attachment flange extending from the first grommet section, and the shelf extending from the first grommet section, and wherein the second bushing section comprises a second grommet section of the grommet that is coupled to the first grommet section to form the grommet body portion surrounding the opening and the grommet collar portion extending from the grommet body portion about the opening.

2. The bushing of claim 1, wherein the attachment flange has a first attachment opening formed therethrough configured to receive a first fastener for attaching to the support structure.

3. The bushing of claim 2, wherein the attachment flange has a second attachment opening formed therethrough spaced apart from the first attachment opening, and wherein the second attachment opening is configured to receive a second fastener for attaching to the support structure.

4. The bushing of claim 3, wherein the attachment flange has a stiffening rib disposed between the first attachment opening and the second attachment opening.

5. The bushing of claim 1, wherein the grommet collar portion extends rearwardly from the grommet body portion, and wherein the shelf extends rearwardly from the grommet collar portion.

6. The bushing of claim 5, wherein the shelf is spaced apart from the attachment flange.

7. The bushing of claim 1, wherein the opening has a central axis, and wherein the shelf has a first surface facing generally towards the central axis, a second surface opposite the first surface, and a first lateral side and a second lateral side that are opposite from each other and that extend from the first surface to the second surface.

8. The bushing of claim 7, wherein the shelf has a shelf opening formed therethrough extending from the first surface to the second surface for receiving a coupling member for coupling the electrical wiring to the shelf.

9. The bushing of claim 7, wherein the shelf has a shelf opening formed therethrough extending from the first lateral side to the second lateral side for receiving a coupling member for coupling the electrical wiring to the shelf.

10. The bushing of claim 1, wherein the first bushing section has first bushing end portions and the second bushing section has attachment tabs, and wherein the first bushing end portions overlap the attachment tabs to couple the first and second bushing sections together.

11. A method for arranging electrical wiring extending through a hole that is formed through a support structure, the method comprising the steps of:
    obtaining a bushing that comprises:
        a grommet comprising a grommet body portion surrounding an opening and a grommet collar portion extending from the grommet body portion about the opening;
        an attachment flange extending from the grommet away from the opening; and
        a shelf extending from the grommet adjacent to the opening, wherein the bushing is a two-piece assembly that includes a first bushing section and a second bushing section that is coupled to the first bushing section, and wherein the first bushing section comprises a first grommet section of the grommet, the attachment flange extending from the first grommet section, and the shelf extending from the first grommet section, and wherein the second bushing section comprises a second grommet section of the grommet that is coupled to the first grommet section to form the grommet body portion surrounding the opening and the grommet collar portion extending from the grommet body portion about the opening;
    attaching the attachment flange to the support structure adjacent to the hole such that the opening extends through the hole and the grommet collar portion covers an interior edge of the support structure that surrounds the hole;
    disposing the electrical wiring through the opening; and
    at least partially supporting the electrical wiring by the shelf.

12. An aircraft comprising:
    an aircraft support structure having an interior edge surrounding a hole that is formed through the aircraft support structure;
    a bushing mounted to the aircraft support structure and comprising:
        a grommet comprising:

a grommet body portion surrounding an opening that extends through the hole; and a grommet collar portion extending from the grommet body portion about the opening and covering the interior edge of the aircraft support structure;

an attachment flange extending from the grommet away from the opening and attached to the aircraft support structure adjacent to the hole; and a shelf extending from the grommet adjacent to the opening; and electrical wiring extending through the opening at least partially supported by the shelf, wherein the bushing is a two-piece assembly that includes a first bushing section and a second bushing section that is coupled to the first bushing section, and wherein the first bushing section comprises a first grommet section of the grommet, the attachment flange extending from the first grommet section, and the shelf extending from the first grommet section, and wherein the second bushing section comprises a second grommet section of the grommet that is coupled to the first grommet section to form the grommet body portion surrounding the opening and the grommet collar portion extending from the grommet body portion about the opening.

13. The aircraft of claim 12, wherein the opening has a central axis, and wherein the shelf has a first surface facing generally towards the central axis, a second surface opposite the first surface, a first lateral side and a second lateral side that are opposite from each other and that extend from the first surface to the second surface.

14. The bushing of claim 13, wherein the shelf has a shelf opening formed therethrough extending from the first lateral side to the second lateral side, and wherein the aircraft further comprises a strap member that is disposed through the shelf opening and that couples the electrical wiring to the shelf.

* * * * *